United States Patent [19]

Brusasco

[11] Patent Number: 4,801,812

[45] Date of Patent: Jan. 31, 1989

[54] SYSTEM FOR CONTROLLING VEHICLE POWER WINDOW REGULATORS

[75] Inventor: Enzo Brusasco, Torino, Italy

[73] Assignee: Roltra S.p.A., Torino, Italy

[21] Appl. No.: 107,965

[22] Filed: Oct. 13, 1987

[30] Foreign Application Priority Data

Oct. 14, 1986 [IT] Italy .............................. 67778 A/86

[51] Int. Cl.[4] ............................................... H02P 1/22

[52] U.S. Cl. ..................................... 307/10 R; 307/9; 307/41; 318/466; 340/52 F

[58] Field of Search ................ 307/10 R, 9 R, 10 LS, 307/10 BP; 318/256, 257, 265, 266, 282, 283, 280, 287, 286, 293, 294, 345 B, 345 C, 434, 443, 445, 446, 465, 466, 474, 478, 480; 340/52 R, 310 R, 310 CP

[56] References Cited

U.S. PATENT DOCUMENTS

| | | | |
|---|---|---|---|
| 3,864,578 | 2/1975 | Lackey | 307/10 R |
| 4,028,620 | 6/1977 | Kitagawa et al. | 307/10 R X |
| 4,055,772 | 10/1977 | Leung | 307/10 R |
| 4,156,151 | 5/1979 | Borroni | 307/10 R |
| 4,347,465 | 8/1982 | Goertler et al. | 318/466 X |
| 4,373,149 | 2/1983 | Coste | 307/10 R X |
| 4,453,088 | 6/1984 | Moore | 307/10 R |
| 4,463,341 | 7/1984 | Iwasaki | 340/52 F X |
| 4,468,596 | 8/1984 | Kinzl et al. | 318/286 X |
| 4,554,461 | 11/1985 | Oho et al. | 307/41 X |
| 4,594,571 | 6/1986 | Neuhaus et al. | 307/10 R X |
| 4,598,237 | 7/1986 | Wada et al. | 318/480 X |
| 4,608,637 | 8/1986 | Okuyama et al. | 318/466 X |
| 4,652,853 | 3/1987 | Tagami et al. | 340/52 F |

*Primary Examiner*—William M. Shoop, Jr.
*Assistant Examiner*—Paul Ip
*Attorney, Agent, or Firm*—Gifford, Groh, Sheridan, Sprinkle and Dolgorukov

[57] ABSTRACT

A system for controlling the power window regulators of at least the doors on the driver and front-seat passenger sides of a vehicle includes control switches having settings corresponding to at least the fully and partly open and closed positions of the windows. The control switches provide electric control signals corresponding to the switch settings. The regulator control system also includes at least one electric control motor and a motor control system which controls the motor in dependence upon the control signals received from the switches. The signals are coded in correspondence to the switch settings, for example, by differing voltage levels, and are supplied along a minimum number of wires (optimally a single wire for all the switches corresponding to each motor) to a decoder in the motor control system. The regulator control system is advantageous in the elimination of the plurality of wires previously required for individually connecting each switch position to the motor control system.

7 Claims, 2 Drawing Sheets

SYSTEM FOR CONTROLLING VEHICLE POWER WINDOW REGULATORS

BACKGROUND OF THE INVENTION

The present invention relates to a system for controlling power window regulators on vehicles, particularly cars. The power window regulators currently installed on cars are known to comprise control switches, usually push-button-operated, for controlling electric motors housed inside the respective doors, for raising or lowering the window. The said control switches usually present a number of settings enabling the window to be raised or lowered both partially and fully in automatic manner. Furthermore, the driver usually has a number of control switches for operating the window regulators on different doors. The control logic by which the window regulator motors are controlled is housed in a block to which the said various switches are connected. Consequently, a relatively large number of connecting wires are required between the said switches and the control system, as many as the contact terminals relative to the various settings on the control switches.

SUMMARY OF THE INVENTION

The aim of the present invention is to provide a system for controlling vehicle power window regulators, which is easier and cheaper to produce as compared with the current system, and which provides for the same operating performance, as well as long-term reliability. Further aims and advantages of the system according to the present invention will be revealed in the following description.

With this aim in view, according to the present invention, there is provided a system for controlling vehicle power window regulators, which system comprises, at least for the doors on the driver and front-seat-passenger side, control switch means, and an electric control motor; which system also comprises a control system designed to receive electric control signals from the said switch means for controlling the said motor; characterised by the fact that it comprises means for coding the said control signals from the said switch means, and respective decoding means on the said control system, for eliminating or reducing the number of connecting elements between each said switch means and the said control system.

BRIEF DESCRIPTION OF THE DRAWINGS

A non-limiting embodiment of the present invention will be described with reference to the accompanying drawings, in which.

DETAILED DESCRIPTION OF THE INVENTION

Figure 1:
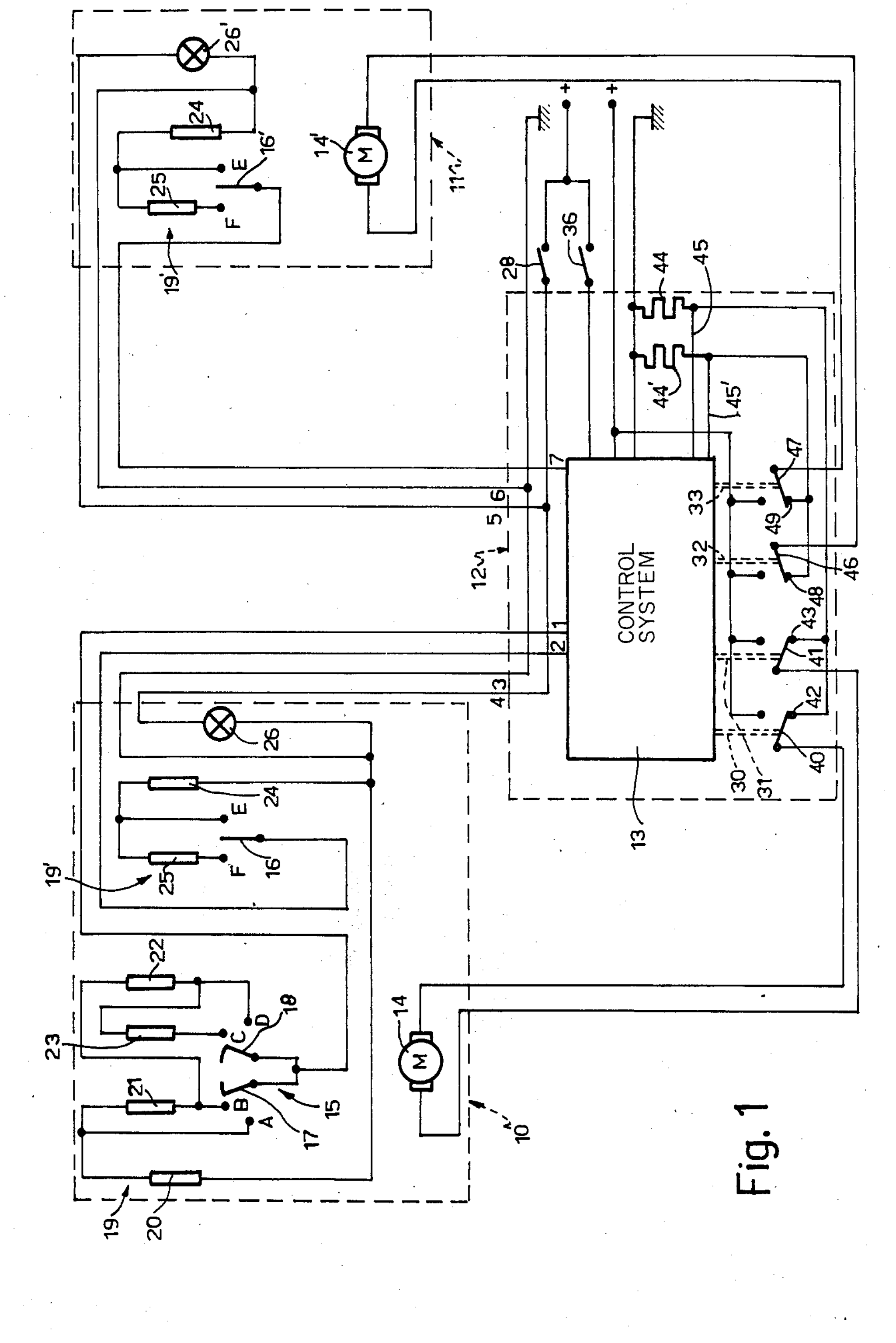
FIG. 1 shows an electric diagram of the power window regulator control system according to the present invention, and applied to the doors on the driver and front-seat-passenger side.

Numbers 10, 11 and 12 in FIG. 1 respectively indicate (as shown by the dotted lines) a block mounted on the driver-side door, a block mounted on the front-passenger-side door, and a block mounted some distance from the other two, for example, inside the engine compartment or dash-panel on the vehicle, and housing a contro system 13. Block 10 comprises a known type of d.c. electric motor 14 for controlling the window on the driver-side door; a dual four-position switch 15 for controlling the window on the driver-side door; and a two-position switch 16 for controlling the window on the front-passenger-side door. The said switches 15 and 16 may be located normally on the armrest on the driver-side door. The said dual switch 15 presents a first contact element 17, which may be operated for connecting its common terminal to two terminals, B and A, for respectively raising the window partially and fully in automatic manner. When the said contact element 17 (shown schematicallY with the end bent) is operated for contacting terminal A, it also remains connected to terminal B. The said dual switch 15 also presents a second contact element 18 identical to contact element 17 and designed to connect its center terminal to terminals C and D, for respectively lowering the window partially and fully in automatic manner. The fixed center terminals on dual switch 15 are connected to input 1 on control system 13, whereas a ground wire 3 from block 12 is connected, via a resistive divider 19, to terminals A, B, C and D. In more detail, the said wire 3 is connected, via resistor 20, to terminal A; terminal A is connected, via resistor 21, to terminal B; terminal B is connected, via resistor 22, to terminal D; and terminal D is connected, via resistor 23, to terminal C.

The common terminal on switch 16, for controlling the front-passenger-side window, is connected to input 2 on control system 13, whereas switch terminals E and F are connected to ground wire 3 via a resistive divider 19'. In more detail, the said wire 3 is connected, via resistor 24, to terminal E, which is, in turn, connected to terminal F via resistor 25. Ground wire 3 is also connected to a lamp 26 for lighting the said switches 15 and 16; which lamp 26 is, in turn, connected to a positive supply terminal over wire 4 to block 12, and via a switch 28 controlled by the light control switch on the vehicle. Block 11 presents a number of elements similar to those of block 10, and comprises a d.c. electric motor 14' for controlling the front-passenger-side window in substantially known manner; and a switch 16' which, via resistive divider 19', connects the ground on block 12 to input 7 on control system 13. Via wire 5 from block 12, switch 28 also supplies a lamp 26', in turn, connected to the ground on block 12 over wire 6.

Figure 2:
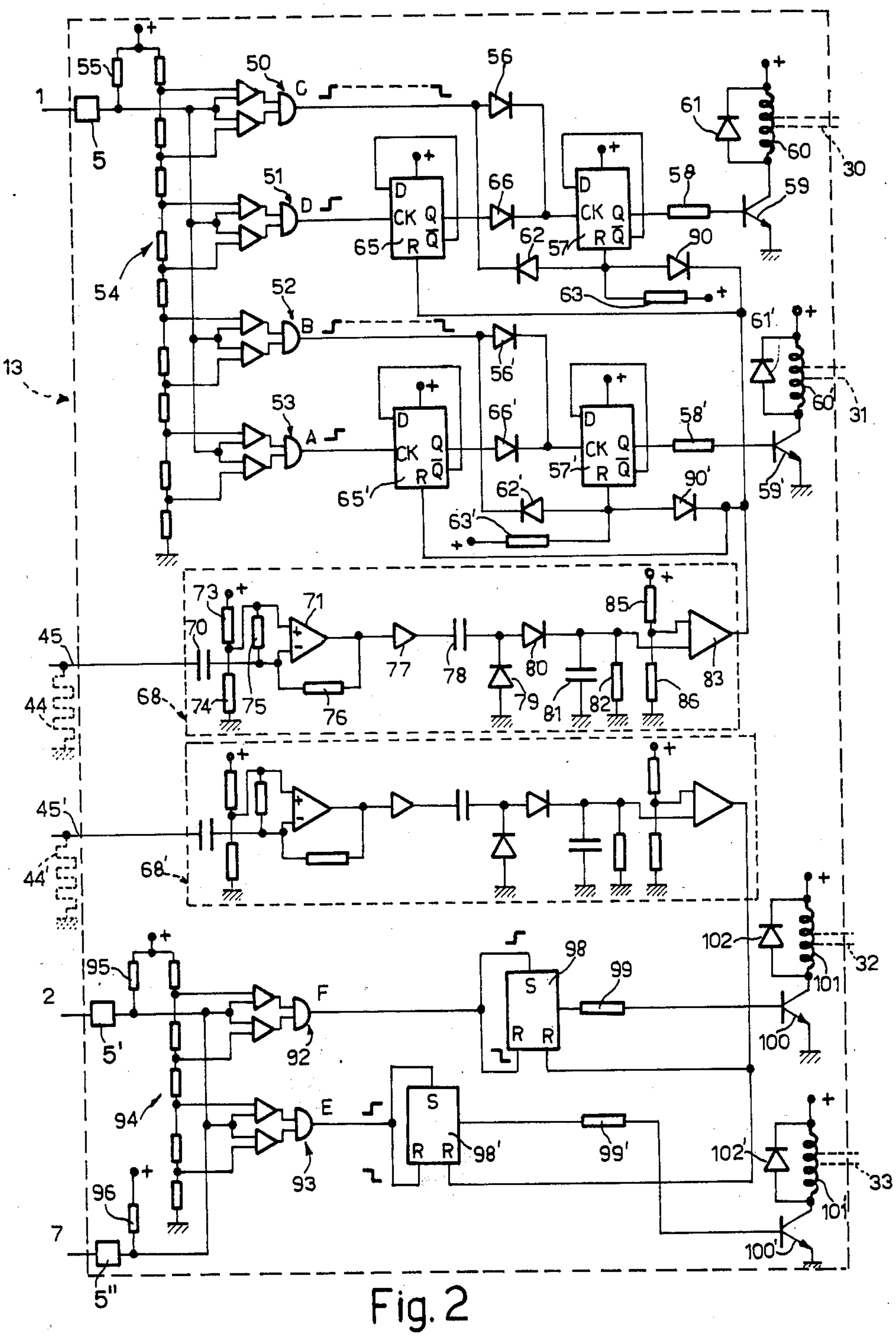
FIG. 2 shows a simplified electric diagram of the control system in the FIG. 1 diagram.

As described in more detail later on with reference to FIG. 2, control system 13 houses four relays for controlling electric motors 14 and 14' in opposite directions. The relays controlling electric motor 14 are numbered 30 and 31, and control respective switches 40 and 41, between the common terminals of which electric motor 14 is connected. The idle terminals, 42 and 43, are connected to the ground on block 12 via a calibrated series resistor 44 of relatively low power, e.g. 33 milliohms. The signal at the terminals of resistor 44 is analysed by control system 13 via wire 45. The normally-open terminals of switches 40 and 41 are connected to a positive supply terminal.

Control system 13 also presents a further two relays, 32 and 33, for controlling respective switches 46 and 47, between the common terminals of which electric motor 14' is connected. Idle terminals 48 and 49 of switches 46 and 47 are also grounded via a calibrated resistor 44' similar to resistor 44, and the signal at the terminals of which is detected by control system 13 via wire 45'. The normally-open terminals of switches 46 and 47 are also connected to a positive terminal. The positive supply terminal is also connected to the supply of control system 13 via a switch 36 activated by the vehicle ignition key. FIG. 2 shows a schematic diagram of control system 13. Via a filtering block 49, for eliminating short-pulse input disturbance, wire 1 is connected to the complementary, negative and positive, inputs of four pairs of threshold comparators 50, 51, 52, 53, each pair of which constitutes a range comparator, the outputs of which are connected to the inputs of a respective AND gate. The reference signals for the other inputs of the said comparators are picked up successively by a resistive divider 54 connected between a positive supply terminal and ground. A further resistor 55 is connected between the positive supply terminal and wire 1, downstream from block 49. The output of range comparator 50 is connected to the anode of diode 56, the cathode of which is connected to the clock (CK) input of a D type flip-flop 57. The said flip-flop 57 presents output $\overline{Q}$ connected to input D, and output Q connected, via resistor 58, to the base of an NPN transistor 59, the emitter of which is grounded, and the collector of which is connected to a positive supply terminal via coil 60 of relay 30. A diode 61 is connected parallel with the said coil 60. The output of range comparator 50 is also connected to the cathode of diode 62, the anode of which is connected to the reset R input of flip-flop 57. The positive supply terminal is also connected to the said R input via a resistor 63. The output of range comparator 51 is connected to the clock (CK) input of a D type flip-flop 65, which presents output $\overline{Q}$ connected to input D, and output Q connected to the anode of diode 66, the cathode of which is connected to the clock (CK) input of flip-flop 57. The outputs of range comparators 52 and 53 are connected to respective flip-flops 57' and 65', similar to flip-flops 57 and 65 already described, the corresponding circuit components being indicated using the same reference numbers plus a ' sign. In this case, the collector of transistor 59' is connected to coil 60' of relay 31.

Wire 45 from calibrated resistor 44 is connected to a known type of block 68 (enclosed by the dotted line) designed to detect arrest of the electric motor (in the example shown, electric motor 14) the armature current of which goes through the said resistor 44. The said block 68 is formed according to the principle described in Italian Patent Application No. 83618-A/84 of Apr. 16, 1984, and mainly comprises an amplifier block, a peak detecting block, and a threshold comparator block. In more detail, wire 45 is connected, via a condenser 70 for eliminating direct current components, to the negative input of a differential amplifier 71, the positive input of which is connected to the intermediate connection between two resistors 73 and 74 connected between a positive supply terminal and ground. A resistor 75 is connected between the positive and negative inputs of amplifier 71, which presents a further resistor 76 connected, for feedback, between its output and the said negative input. Via an amplifier 77 and condenser 78, the output of amplifier 71 is connected to the cathode of diode 79, the anode of which is grounded, and to the anode of diode 80, the cathode of which is grounded, via the parallel connection of condenser 81 and resistor 82, and connected to one input of threshold comparator 83, the other input of which is connected to the intermediate connection between two resistors 85 and 86 series-connected between a positive supply terminal and ground. The output of comparator 83, which is also the output of detecting block 68, is connected to the reset R inputs of flip-flops 65 and 65', and to the cathodes of respective diodes 90 and 90', the anodes of which are connected to the reset R inputs of flip-flops 57 and 57' respectively.

Wire 2 to control system 13 is connected, via a filtering block 49' similar to block 49, to the complementary inputs of two pairs of threshold comparators also constituting range comparators 92 and 93, the other reference inputs of which are connected, as already seen in connection with comparators 50, 51, 52 and 53, to the intermediate connecting points of a resistive divider 94 connected between a positive supply terminal and ground. A resistor 95 is connected between a positive supply terminal and wire 2, downstream from block 49'. Wire 7 to control system 13 is also connected, via a block 49'' similar to block 49', to the complementary inputs of range comparators 92 and 93. A resistor 96 is connected between a positive supply terminal and wire 7, downstream from block 49''. The output of range comparator 92 is connected to the signal inputs and the reset R input of flip-flop 98, the output of which is connected, via resistor 99, to the base of an NPN transistor 100, the emitter of which is grounded, and the collector of which is connected to a positive supply terminal via coil 101 of relay 32. A diode 102 is connected parallel with the said coil 101. Similarly, the output of range comparator 93 controls coil 101' of relay 33, the corresponding circuit components being indicated using the same reference numbers plus a ' sign. Wire 45' from calibrated resistor 44' is connected, via a detecting block 68' similar to block 68, to the reset R inputs of flip-flops 98 and 98'.

Operation of the power window regulator control system according to the present invention is as follows.

For partially lowering the window on the driver's side, the driver sets dual switch 15 to a first setting wherein terminal C is connected. The level of the signal sent along wire 1 to control system 13 is therefore determined by all of resistors 20, 21, 22 and 23 being connected on resistive dividier 19. In control system 13, the value of this signal is detected as falling within the range defined by threshold comparator pair 50, which is therefore the only pair issuing a signal produced by setting switch 15 to position C. The output signal from range comparator 50 activates flip-flop 57 which, in turn, via transistor 59, activates relay 30 which, by activating switch 40 (FIG. 1), operates electric motor 14 in the direction designed to lower the window. The window continues moving down as long as the driver keeps terminal C connected on dual switch 15. When, on the other hand, switch 15 is released, the output signal from range comparator 50 is cut off and, via resistor 63 and diode 62, a reset signal is supplied to flip-flop 57, which de-activates relay 30, thus causing electric motor 14 to be arrested due to short-circuiting of the terminals by swiches 40 and 41 in the position shown in FIG. 1. In the event of the window sliding down to the bottom limit position, with dual switch 15 still connected to terminal C, electric motor 14 is arrested and, as block 68 no longer detects the oscillation frequency (about 300 Hz) of the armature current produced during normal operation of the motor, the output signal from block 68 is cut off, flip-flop 57 is reset, and relay 30 de-activated so as to cut off supply to motor 14.

For fully lowering the window automatically, the driver sets dual switch 15 to a second setting wherein terminal D is connected, at the same time short-circuiting terminal C. In this case, the level of the signal sent along wire 1 is determined by resistors 20, 21 and 22 of resistive divider 19. This different level is detected as falling within the range of threshold comparator pair 51, which is therefore the only pair to issue an output signal. The output signal from range comparator 51 activates flip-flop 65 which, via diode 66, activates flip-flop 57 and relay 30 as already described, thus activating switch 40 for supplying electric motor 14 in the same direction as before, for lowering the window. Subsequent release of dual switch 15 in no way affects operation of electric motor 14 in that flip-flops 65 and 57 remain active. Subsequent to arrest of the window in the bottom limit position, and arrest of electric motor 14 being detected by block 68 as already described, the said flip-flops 65 and 57 are reset, and switch 40 is returned to the FIG. 1 position, thus cutting off supply to electric motor 14. For partially raising the window, the driver sets dual switch 15 to the first setting wherein terminal B is connected, and an output signal is only supplied by range comparator 52. This activates flip-flop 57′ so as to activate relay 31 which, via switch 41, supplies electric motor 14 in the opposite direction to previously. For fully raising the window automatically, dual switch 15 is set to the second setting wherein terminal A is connected and an output signal only supplied by range comparator 53. Operation of the output signals from range comparators 52 and 53 is the same as for those from range comparators 50 and 51.

For operating the window regulator on the front-passenger-side door, the driver sets switch 16 so as to connect terminal E or F and so produce a signal on wire 2 the level of which is detected as falling within the range of comparator 93 or 92. In the first case, wherein switch 16 is set so as to connect terminal E, an output signal is supplied by range comparator 93, the rising edge of which alters the output of flip-flop 98′ so as to activate relay 33, which, via switch 47, raises the window. Subsequent to release of the said switch 16, the falling edge of the signal from range comparator 93 resets flip-flop 98′ so as to de-energise relay 33 and so arrest electric motor 14′. In the second case, wherein switch 16 is set so as to connect terminal F, an output signal is supplied by range comparator 92, the rising and falling edges of which respectively activate and de-activate flip-flop 98, thus energising or de-energising relay 32 which either reverses or arrests electric motor 14′. The normal oscillating frequency of the armature current on the said electric motor 14′ is detected via wire 45′ from calibrated resistor 44′. Therefore, upon electric motor 14′ being arrested, flip-flops 98 and 98′ are reset and relays 32 and 33 deenergised via block 68′, as already described in connection with block 68.

For operating the front-passenger-side window, electric motor 14′ may be controlled directly by the passenger, using switch 16′, which, via resistive divider 19′ and terminals E and F, operates over wire 7 (FIG. 2) connected to the same range comparators 92 and 93 for detecting the selected terminal.

The advantages of the power window regulator control system according to the present invention will be clear from the foregoing description. Firstly, it provides for eliminating the various connecting wires between blocks 10 and 11 and block 12 containing control system 13, and corresponding to the various settings of control switches 15, 16 and 16′, the various settings of each said switch being coded by means of a respective electric signal level, and supplied to control system 13 over a single connecting wire, thus enabling considerable cost cutting in terms of component manufacture, as well as simplifying both manufacture and assembly. Secondly, for fully raising or lowering the window automatically, operation need no longer be maintained, often excessively, for a given length of time, thus risking excessive strain on the components, in that supply to the electric motors controlling the windows is cut off immediately, upon arrest of the motors being detected by circuits 68 and 68′.

To those skilled in the art it will be clear that changes may be made to the embodiment of the control system as described and illustrated herein without, however, departing from the scope of the present invention. For example, in place of a resistive divider, the means for coding the switch settings may consist of other components, such as diodes, series-connected, for example, so as to form a divider, or transistors. In place of the range comparator blocks described herein, the means for decoding the signal received over the single wire connecting the switch means to the control system, for detecting the switch setting, may consist of an analogue-digital converting block followed by a microprocessor for match-checking the control switch settings against given output signal logic level combinations. The means for coding the control switch setting may comprise conveyed-wave or radiofrequency transmission means for transmitting an electric signal or a combination electric signal depending on the control switch setting. The decoding means on control system 13 may comprise respective conveyed-wave or radiofrequency receiving means for receiving the transmitted electric signal. In the latter case, the connecting elements between the control switches and the control system may be dispensed with entirely.

Filtering block 49 may comprise a straightforward resistor-condenser component, or a Schmitt trigger block for merely retarding the rising edge of the signal. Or, it may comprise a shift register on which the input signal is only supplied to the output after a given delay time determined by a given number of clock pulses. Dual switch 15 may be a mercury type with two settings in either direction. The system described may also be applied for controlling the window regulators on all four vehicle doors. In this case, block 10 on the driver-side door will conveniently comprise a further two switches for controlling the window regulators on the rear doors, whereas control system 13 will present a further two portions similar to those consisting of connecting wires 2 and 7, with a respective detecting block 68′. In the embodiment of the present invention described herein, the two protectors for each electric motor may also be dispensed with, in that supply cut-off upon arrest of the motors is detected and controlled by block 68.

I claim:

1. A system for controlling the power window regulators of at least the doors on the driver and front-seat passenger side of a vehicle, comprising:

a plurality of individually selectable control switch means, each producing control signals corresponding to specific switch means settings, said switch means being mounted in said doors;

at least one electronic control motor;

a control system means for controlling said motor in dependence upon said control signals, said control system means being mounted remotely from said switch means;

a single wire connecting all of said switch means for a single one of said at least one motor to said control system means;

means for coding said control signals from said switch means by supplying a corresponding electrical signal level in dependence upon said specific switch settings; wherein said coding means comprises resistive dividers including components and said switch means are branch-connected between said components to said connecting elements; and respective decoding means in said control system means comprising a plurality of threshold comparators for supplying decoded signal lines, equal in number to said switch means settings;

whereby the number of elements connecting said switch means and said control system means is minimized to said single wire for each of said at least one motor.

2. The invention according to claim 1, wherein said decoding means comprises an analog-digital converting block.

3. The invention according to claim 1, wherein said switch means settings correspond to at least partial and complete raising and lowering of said windows.

4. The invention according to claim 1, further comprising electrical means supplying said at least one motor, and wherein said control system means further comprises means for detecting operation and arrest of said at least one motor and for correspondingly enabling or disabling said electrical supply means.

5. The invention according to claim 4, wherein said detecting means comprises a circuit means connected in parallel with said electrical means supplying said at least one motor, said circuit means including means for detecting the absence of the normal oscillating frequency of the current in an armature of said at least one motor, and for issuing a signal disabling said electrical means supplying said at least one motor upon such absence.

6. A system for controlling the power window regulators of at least the doors on a driver and front-seat passenger side of a vehicle, comprising:

a plurality of control switch means providing electric control signals;

at least one electric control motor and electrical means supplying said at least one motor;

a control system means for controlling said motor in dependence upon said electric control signals produced by said switch means;

means between said switch means and said control system means for coding said control signals; and decoding means in said control system means;

wherein said control system means further comprises means for detecting operation and arrest of said at least one motor and for correspondingly enabling or disabling said electrical supply means.

7. The invention according to claim 6, wherein said detecting means comprises a circuit means connected in parallel with said electrical means supplying said at least one motor, said circuit means including means for detecting the absence of the normal oscillating frequency of the current in an armature of said at least one motor, and for issuing a signal disabling said electrical means supplying said at least one motor upon such absence.

* * * * *